US007076675B2

(12) United States Patent
Martinez Perez et al.

(10) Patent No.: US 7,076,675 B2
(45) Date of Patent: Jul. 11, 2006

(54) DISPLAY POWER MANAGEMENT OF A PORTABLE COMMUNICATION DEVICE THAT DETECTS A CONTINUOUS TALK CONDITION BASED ON A PUSH-TO-TALK BUTTON BEING ACTIVATED A PREDETERMINED NUMBER OF TIMES

(75) Inventors: Ricardo Martinez Perez, Plantation, FL (US); Angel L. Torres Cardona, Pompano Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 100 days.

(21) Appl. No.: 10/430,533

(22) Filed: May 6, 2003

(65) Prior Publication Data

US 2004/0225904 A1    Nov. 11, 2004

(51) Int. Cl.
*G06F 1/26* (2006.01)
(52) U.S. Cl. .................. 713/324; 455/566; 455/574
(58) Field of Classification Search ............... 455/566, 455/574; 713/324
See application file for complete search history.

(56) References Cited

U.S. PATENT DOCUMENTS

| 5,881,377 | A | * | 3/1999 | Giel et al. ............... 455/343.1 |
| 5,884,156 | A | * | 3/1999 | Gordon ..................... 455/321 |
| 5,905,900 | A | | 5/1999 | Combs et al. |
| 6,278,887 | B1 | * | 8/2001 | Son et al. ................... 455/566 |
| 6,317,614 | B1 | * | 11/2001 | Okada ........................ 455/574 |
| 6,408,187 | B1 | * | 6/2002 | Merriam .................... 455/458 |
| 6,469,639 | B1 | * | 10/2002 | Tanenhaus et al. .... 340/870.16 |
| 6,631,192 | B1 | * | 10/2003 | Fukiharu ................ 379/433.07 |
| 6,725,064 | B1 | * | 4/2004 | Wakamatsu et al. ........ 455/566 |
| 6,741,835 | B1 | * | 5/2004 | Pulver ....................... 455/3.05 |

OTHER PUBLICATIONS

Schmidt et al., "Advanced Interaction in Context", Proceedings of the First International Symposium on Handheld and Ubiquitous Computing (HUC'99), pp. 89-101, Sep. 27-29, 1999.*

Hinckley et al., "Sensing Techniques for Mobile Interaction", Proceedings of the 13th Annual ACM Symposium on User Interface Software and Technology (ACM UIST'00), pp. 91-100, Nov. 2000.*

* cited by examiner

*Primary Examiner*—Thomas Lee
*Assistant Examiner*—Albert Wang

(57) ABSTRACT

A portable communication product (10) such as a cellular phone includes a transceiver radio having a microphone (20), an earpiece (22), a keypad (18) and a display (12) coupled to the transceiver radio. The portable communication product further includes at least one sensor (24, 26, 28, or 30) and a processor (16). The sensor can be used for detecting a user condition of the portable communication device such as a talk condition when the user is assumed to be talking on the portable communication product. The processor can be programmed to at least reduce power provided to the display when the sensor detects the talk condition.

21 Claims, 2 Drawing Sheets

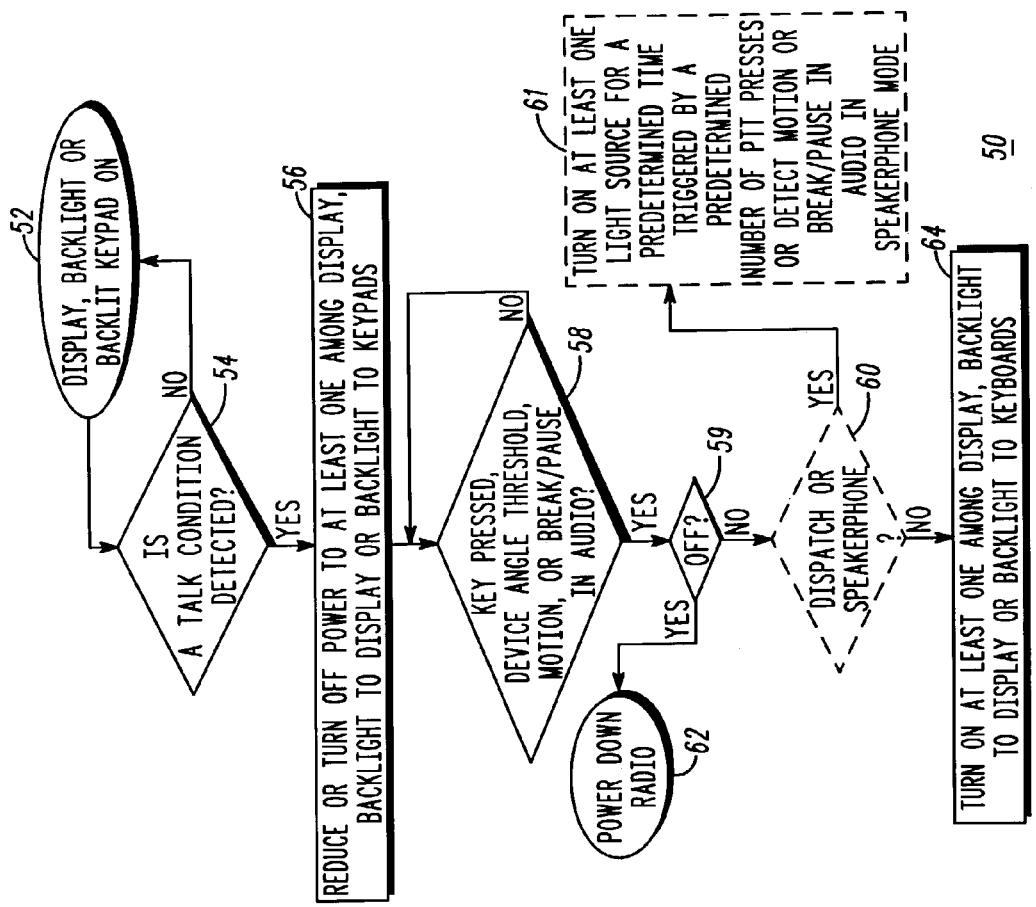
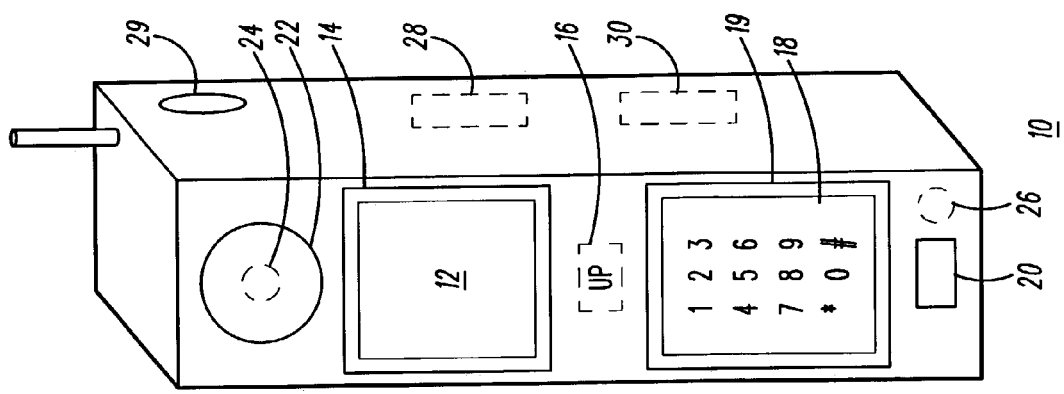

US 7,076,675 B2

DISPLAY POWER MANAGEMENT OF A PORTABLE COMMUNICATION DEVICE THAT DETECTS A CONTINUOUS TALK CONDITION BASED ON A PUSH-TO-TALK BUTTON BEING ACTIVATED A PREDETERMINED NUMBER OF TIMES

CROSS-REFERENCE TO RELATED APPLICATIONS

Not applicable

FIELD OF THE INVENTION

This invention relates generally to power management, and more particularly to a method and system for power management for improved battery life in a portable communication device.

BACKGROUND OF THE INVENTION

Power management in portable communication devices is an ever-present issue now being further exacerbated by the popular introduction and use of larger color displays with white LED backlights. User talk times are significantly affected because most of these large color displays remain on during phone calls. Existing phones fail to take advantage of some patterns exhibited by handset users as a means to reduce current drain. A typical user averaging a three (3) minute phone call will perceive a noticeable reduction in talk time due to the fact that both a backlight and a display remain on while the call is active. Some phones also include backlit keypads that remain illuminated as well during an active call.

Portable phones generally keep their display on at all times during a call while the backlight is typically turned off after 30 seconds of no key-activity (user selectable). The 30 seconds that the backlight remains on combined with a display that is not turned off during a phone call substantially affects the talk times based on the actual usage pattern. In some phones, this method may not be sufficiently efficient enough because it may leave the backlight turned on (using 40–60 mA) up to a significant percentage of each phone call time. With displays and illumination mechanisms in portable communication products increasingly vying for additional power from a portable battery, existing methods fail to provide adequate talk and standby times demanded by consumers.

SUMMARY OF THE INVENTION

A method and apparatus for display power management in a portable communication device can provide additional battery savings to enable increased talk times and standby times without altering current battery technology. Embodiments in accordance with the present invention take advantage of actual usage patterns of users of portable phones to reduce current drain by displays and other illumination sources in cellular phones and other portable communication devices.

In a first aspect of the present invention, a portable communication device comprises a transceiver radio, a display coupled to the transceiver radio, a sensor and a processor. The sensor can be used for detecting a user condition of the portable communication device such as a talk condition when the user is assumed to be talking on the portable communication device. The processor can be programmed to at least reduce power provided to the display when the sensor detects the talk condition. The processor can also turn off power to the display during a talk condition if desired.

In a second aspect of the present invention, a portable communication device comprises a transceiver radio, a light source coupled to the transceiver radio, an environmental sensor and a processor. The environmental sensor can be used for detecting a user condition of the portable communication device such as a talk condition when the user is assumed to be talking on the portable communication device and the processor can be programmed to at least reduce power provided to the light source when the sensor detects the talk condition.

In a third aspect of the present invention, a method of power management for a radio communication device having a display comprises the steps of detecting a talking condition and at least reducing the power provided to the display within a predetermined time of the talking condition. The step of detecting a talk condition can be selected from the group of conditions consisting of a) detecting if a predetermined volume of acoustic sound is being received at a microphone indicative of a user talking on the portable communication device; b) measuring at least one among a spectrum density and a spectrum energy of a bounced signal to determine the proximity of a user's head to an earpiece of the portable communication device; c) measuring a predetermined period after a phone call starts; d) detecting an angle at which the portable communication device is positioned; e) detecting a vibration of the portable communication device; and f) detecting if the portable communication device is in a user's hand.

BRIEF DESCRIPTION OF THE DRAWINGS

FIG. 1 is a block diagram of a portable communication product having a power management system in accordance with the present invention.

FIG. 2 illustrates a flow chart of a method of managing power in a portable communication product in accordance with the present invention.

DETAILED DESCRIPTION OF THE DRAWINGS

Figure 3:
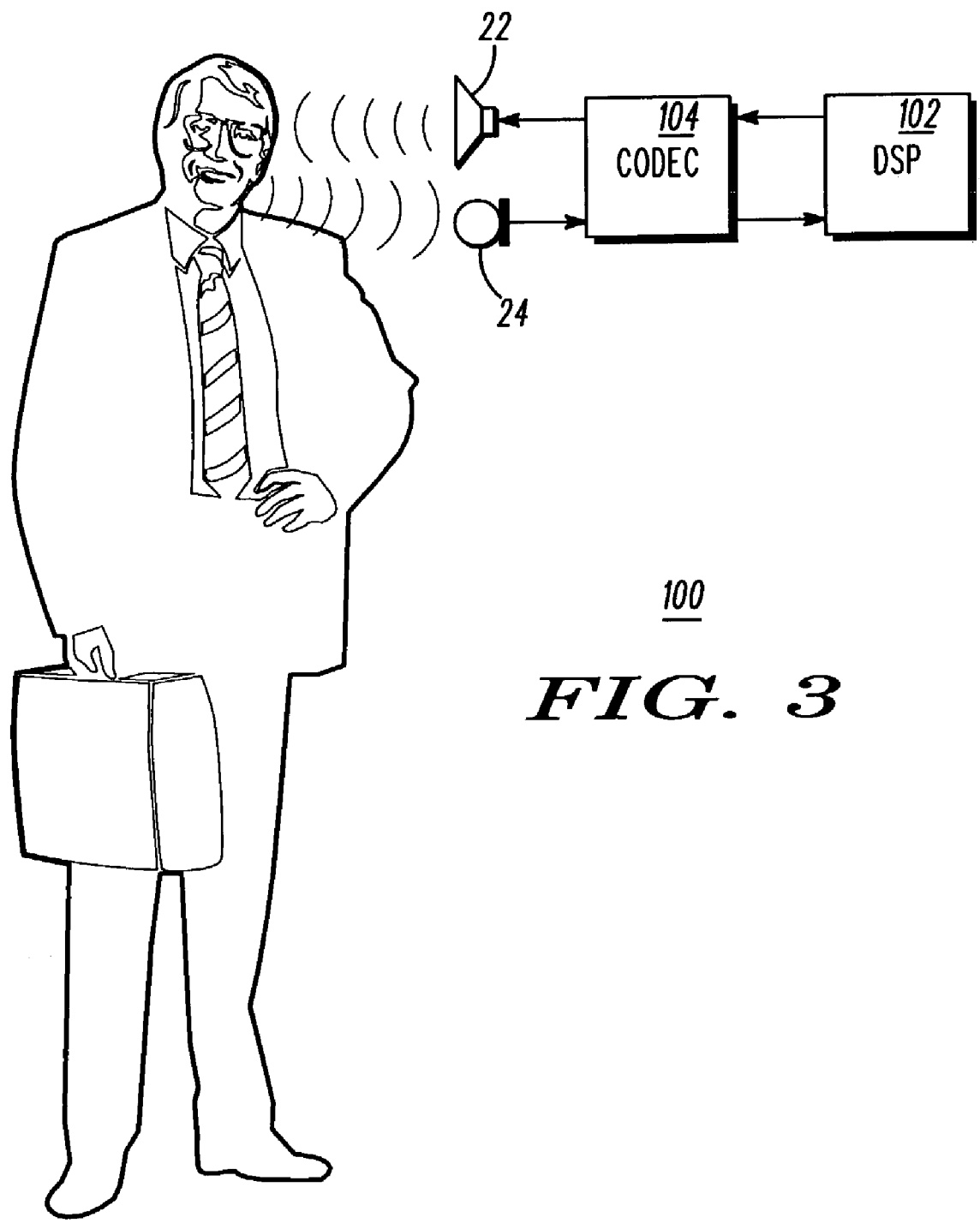
FIG. 3 is a block diagram of a digital signal processor and coder/decoder used as a sensor for acoustic feedback for determining proximity in accordance with the present invention.

Referring to FIG. 1, a portable communication product 10 such as a cellular phone includes a transceiver radio having a microphone 20, an earpiece 22, a keypad 18 and a display 12 (such as a color display) coupled to the transceiver radio. The portable communication product 10 further includes at least one sensor (24, 26, 28 or 30) and a processor 16. The sensor can be used for detecting a user condition of the portable communication device such as a talk condition when the user is assumed to be talking on the portable communication device. The processor 16 can be programmed to at least reduce power provided to the display 12 when the sensor detects the talk condition. The processor 16 can also turn off power to the display 12 during a talk condition if desired.

In one embodiment, the portable communication device 10 can also include other illumination or lighting devices. For example, the display 12 can have backlighting 14 and/or the keypads can have backlighting 19 as is well known in the industry. Although backlighting provides great ergonomic benefits to a user in visually reading a display or keypad, the additional current drain on a battery can significantly reduce overall talk time. Thus, to overcome this disadvantage, the present invention accounts for actual usage by a user by sensing a talk condition. A talk condition should generally be understood as the condition when a user is on an active call and speaking into the microphone 20 or listening to the earpiece 22. A light source in the portable communication device 10 should also be understood as being either the display device itself, a light source for backlighting the display device, and a light source for backlighting the keypad of the portable communication device. Of course, other illumination devices that can be used in a portable communication are contemplated within the present invention.

A talk condition can be sensed in quite a number of ways. After the talk condition is detected or sensed, at least one or more among the display 12, the backlight 14 (for the display), or the backlight 19 (for the keypad) can be turned off or at least operate at a reduced power level. A talk condition, for example, can be sensed by detecting if a predetermined volume of acoustic sound is being received at the microphone 20 or at another sensor such as a proximity sensor 26 indicative of a user talking on the portable communication device. The sensors 20 or 26 can detect if a predetermined volume of acoustic sound is being received at either sensor. Alternatively, a talk condition can be sensed by measuring at least one among a spectrum density or a spectrum energy of a bounced signal to determine the proximity of a user's head to an earpiece of the portable communication device using a microphone or a proximity sensor 24 as further detailed with respect to FIG. 3. A talk condition can also be sensed by detecting an angle at which the portable communication device 10 is positioned or by detecting a vibration of the portable communication device 10. There is no need to keep the display 12 on if the phone is sitting idle. Ergonomically, a phone will be used at a certain predetermined angle-range anytime a phone call is active and the user is listening to the earpiece. A sensor 28 for sensing either the angle or a vibration of the portable communication device can be embodied by a microelectronic mechanical systems (MEMS) device. Another way for sensing a talk condition can be achieved by sensing if the portable communication device 10 is in a user's hand. A sensor 30 can be a differential pressure sensor or a thermal sensor that indicates that the phone is in a user's hands. All the sensors described above should be considered environmental sensors with respect to the present invention.

In yet another alternative, sensing a talk condition can involve simply measuring a predetermined period after a phone call starts. The predetermined time period can be user selectable and can be programmed using the processor 16 as a timer. After the phone call starts and upon expiration of the predetermined period, the processor 16 can be programmed to shut off or reduce power to the display 12 or other illumination sources in the portable communication device 10. Even if the portable communication device 10 includes a speakerphone (with sufficient amplification, earpiece 22 can serve as a speaker for the speakerphone) that is operating in a speakerphone mode (where the user may initially want to view an illuminated display), this battery saving technique can still be effective in capitalizing on actual user usage without much detriment to ergonomics. For example, a timer can be initiated when entering the speakerphone mode wherein at least one among the display, the backlight to display and/or the backlight to the keypads are initially turned on. After the timer expires, the power management technique would turn off or reduce power to the display or one or more of the backlights. Additionally, while in a speakerphone mode and after a timer has expired as described above, the power management technique can also monitor for movement of the portable communication device or breaks or pauses in audio to subsequently activate a display or backlight for a predetermined period or until a predetermined event such as detection of an idle condition. Users of portable phones in a speakerphone mode typically allow their phone to lay idle on a flat surface during a conversation. The present invention takes advantage of this user behavior by entering a battery saving mode until motion (or change in angle) is detected.

The present invention further contemplates battery saving techniques in portable communication devices that include a dispatch call function using a radio push-to-talk (PTT) button 29 as shown in FIG. 1. On a typical dispatch call, the PTT button 29 is pressed every time the user talks wherein the user may press the PTT button 29 four (4) to five (5) times during a 1 minute period without the need to turn on any light sources until the dispatch session actually ends. In such instances, the display or backlights can be turned on for a predetermined number of PTT key depressions. In one embodiment, a PTT key depression triggers activation of the backlight and/or display and subsequently turns off at the expiration of a predetermined time period or predetermined event.

Using the sensors 20, 22, 24, 26, 28 or 30 in combination with the processor 16, the portable communication device 10 can turn off or reduce the power provided to at least one among the display 12, the backlight 14, or a light source (19) for the backlit keypad 18 when the portable communication device 10 is in a talk condition. Power for the light sources can be reduced or turned off either immediately upon detection of a talk condition or within a predetermined time as may be programmed into the portable communication device 10. The shorter the predetermined time period, the more power that will likely be saved. The predetermined time period can be one (1) second for example. As mentioned above, the present invention takes account of actual user behavior and eliminates wasteful power consumption during periods when a user would normally not be looking at his or her display or keypad.

In one particular embodiment as shown in FIG. 3, the sensor or sensors 100 can comprise the earpiece 22, the microphone 24, a coder/decoder 104 and a digital signal processor (DSP) 102. The sensor 100 can utilize an acoustic feedback algorithm that measures at least a spectrum density or a spectrum energy of a bounced signal to determine the proximity of a user's head to the earpiece 22 of the portable communication device. The sensor 100 can also be used to control the outbound audio quality or provide a constant audio level (from the perspective of the user) by automatically adjusting the audio level based on the proximity to the ear of the user. This automatic adjustment can additionally lower the power consumption by the audio coder/decoder 104.

Operationally, a method 50 of power management for a radio communication device having a display in accordance with the present invention can provide additional power savings, particularly for portable communication devices having power consuming light sources such as large color displays and backlights for displays and keypads. If a display, a backlight for a display or a backlit keypad is on at step 52, then the method determines if a talk condition is detected at decision block 54. If a talk condition is not detected, then the method returns. If the talk condition is detected at decision block 54, then the power is either reduced or turned off at step 56 for at least one among the display, the backlight for the display or the backlight for the keypad. Next, at decision block 58, it is determined if a key on the keypad is depressed by the user, if a predetermined device angle or other motion is detected or if a break in audio is detected. The conditions in decision 58 can typically be conditions indicative that a talk condition is at least temporarily finished. If a keypad is depressed, it should be determined what kind of key was depressed. If the key is a power off key at decision block 59, then the lighting sources remain in their current state (off) as the radio powers down at step 62.

If the key is not a power off key (at decision block 59, but rather a key activating a speakerphone or a PTT button activating a dispatch call at the optional decision block 60, then the method can optionally turn on at least one light source for a predetermined time in a speakerphone mode or alternatively turn on at least one light source during a predetermined number of PTT key depressions during a dispatch call session at step 61 before returning to the battery saving mode of step 56. A light source can also be turned on after the predetermined time in the speakerphone mode by detecting motion (or change in angle) or by detecting a break or pause in audio. In dispatch mode, the predetermined number of PTT key depressions before a talk condition occurs can vary. A user of a cellular phone with dispatch capability typically needs a display to be lit for just the first time the PTT key is depressed during a dispatch call session as long as the first PTT key depression was acknowledged by another. If desired, the predetermined number of PTT key depressions where a light source remains on can be set to two or more, but a lower number will likely provide better battery savings. If the key depressed is not a power-off button or a dispatch or speakerphone activation, another key is depressed and at least one light source such as the display, backlight or backlit keypad is turned on at step 64. Subsequently, the method 50 returns to step 52.

As mentioned previously, the step of detecting a talk condition can be achieved by monitoring or detecting at least one among the conditions of a) detecting if a predetermined volume of acoustic sound is being received at a microphone indicative of a user talking on the portable communication device; b) measuring at least one among a spectrum density and a spectrum energy of a bounced signal to determine the proximity of a user's head to an earpiece of the portable communication device; c) measuring a predetermined period after a phone call starts; d) detecting an angle at which the portable communication device is positioned; e) detecting a vibration of the portable communication device; or f) detecting if the portable communication device is in a user's hand. How the method 50 can detect the conditions described above can be embodied in many different forms using individually or in combination sensors and timers and other devices.

In light of the foregoing description of the invention, it should be recognized that the present invention can be realized in hardware, software, or a combination of hardware and software. A method and system for power management in a communication device according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the methods described herein, is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. A computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A portable communication device, comprising:
    a transceiver radio;
    a display coupled to the transceiver radio;
    a sensor for detecting a user condition of the portable communication device, wherein the user condition can comprise a continuous talk condition when the user is assumed to be talking on the portable communication device;
    a processor programmed to at least reduce power provided to the display when the sensor detects the continuous talk condition; and
    a push-to-talk button that operates the portable communication device in a dispatch mode and that serves as the sensor, wherein the processor detects the continuous talk condition when the push-to-talk button is activated a predetermined number of times.

2. The portable communication device of claim 1, wherein the portable communication device further comprises a backlit keypad and wherein the processor is further programmed to turn off at least one among the display and a light source for the backlit keypad when the portable communication device is in the talk condition.

3. The portable communication device of claim 1, wherein the portable communication device further comprises a backlight for the display, wherein the processor is further programmed to turn off at least one among the backlight and the display when the portable communication device is in the talk condition.

4. The portable communication device of claim 1, wherein the portable communication device further comprises a backlight for the display and a backlit keypad, wherein the processor is further programmed to turn off at least one among the display, the backlight, and a light source for the backlit keypad when the portable communication device is in the talk condition.

5. The portable communication device of claim 1, further comprising a proximity sensor for detecting if a predetermined volume of acoustic sound is being received at a microphone indicative of a user talking on the portable communication device.

6. The portable communication device of claim 1, further comprising a second sensor that comprises an acoustic feedback algorithm that measures at least one among a spectrum density and a spectrum energy of a bounced signal to determine the proximity of a user's head to an earpiece of the portable communication device.

7. The portable communication device of claim 5, wherein the proximity sensor further comprises a microphone placed adjacent to the earpiece.

8. The portable communication device of claim 6, wherein the second sensor is further used to maintain a constant audio level output from the earpiece.

9. The portable communication device of claim 1, wherein the portable communication device further comprises a timer for measuring a predetermined period after a phone call starts and upon expiration of the predetermined period the processor is further programmed to shut off the display.

10. The portable communication device of claim 1, further comprising a MEMS device for detecting an angle at which the portable communication device is positioned.

11. The portable communication device of claim 1, further comprising a MEMS device for detecting vibration of the portable communication device.

12. The portable communication device of claim 1, further comprising a differential pressure sensor for detecting if the portable communication device is in a user's hand.

13. The portable communication device of claim 12, wherein the processor is further programmed to turn off the display if the differential pressure sensor detects the portable communication device in a users hand and no keys other than an off key is depressed.

14. The portable communication device of claim 1, wherein the display is a color display.

15. A portable communication device, comprising:
a transceiver radio;
a light source coupled to the transceiver radio;
a sensor for detecting a user condition of the portable communication device, wherein the user condition can comprise a continuous talk condition when the user is assumed to be talking on the portable communication device;
a processor programmed to at least reduce power provided to the light source when the sensor detects the continuous talk condition; and
a push-to-talk button that operates the portable communication device in a dispatch mode and that serves as the sensor, wherein the processor detects the continuous talk condition when the push-to-talk button is depressed a predetermined number of times.

16. The portable communication device of claim 15, wherein the light source is a display device, a light source for backlighting the display device, or a light source for backlighting a keypad for the portable communication device.

17. A method of power management for a radio communication device having a display, comprising the steps of:
detecting a continuous talk condition through the use of a push-to-talk button that initiates a dispatch call on the radio communication device, wherein the continuous talk condition is detected based on the push-to-talk button being activated a predetermined number of times; and
in response to the continuous talk condition being detected, at least reducing the power provided to the display.

18. The method of claim 17, wherein the method further comprises the step of providing power to the display when the method no longer detects a talk condition and a key on the communication device is depressed.

19. The method of claim 17, wherein the step of detecting a talk condition is also includes a) detecting if a predetermined volume of acoustic sound is being received at a microphone indicative of a user talking on the portable communication device; b) measuring at least one among a spectrum density and a spectrum energy of a bounced signal to determine the proximity of a user's head to an earpiece of the portable communication device; c) detecting an angle at which the portable communication device is positioned; d) detecting a vibration of the portable communication device; or e) detecting if the portable communication device is in a user's hand.

20. The method of claim 17, wherein the method further comprises the step of at least reducing the power provided to the display device, a light source for backlighting the display device, or a light source for a backlit keypad for the portable communication device.

21. The method of claim 17, wherein the method further comprises the step of turning on the display when detecting at least one among the conditions selected from a break from a pause in audio, a movement of the radio communication device, a detected device angle or a key depression on the radio communication device.

* * * * *